UNITED STATES PATENT OFFICE.

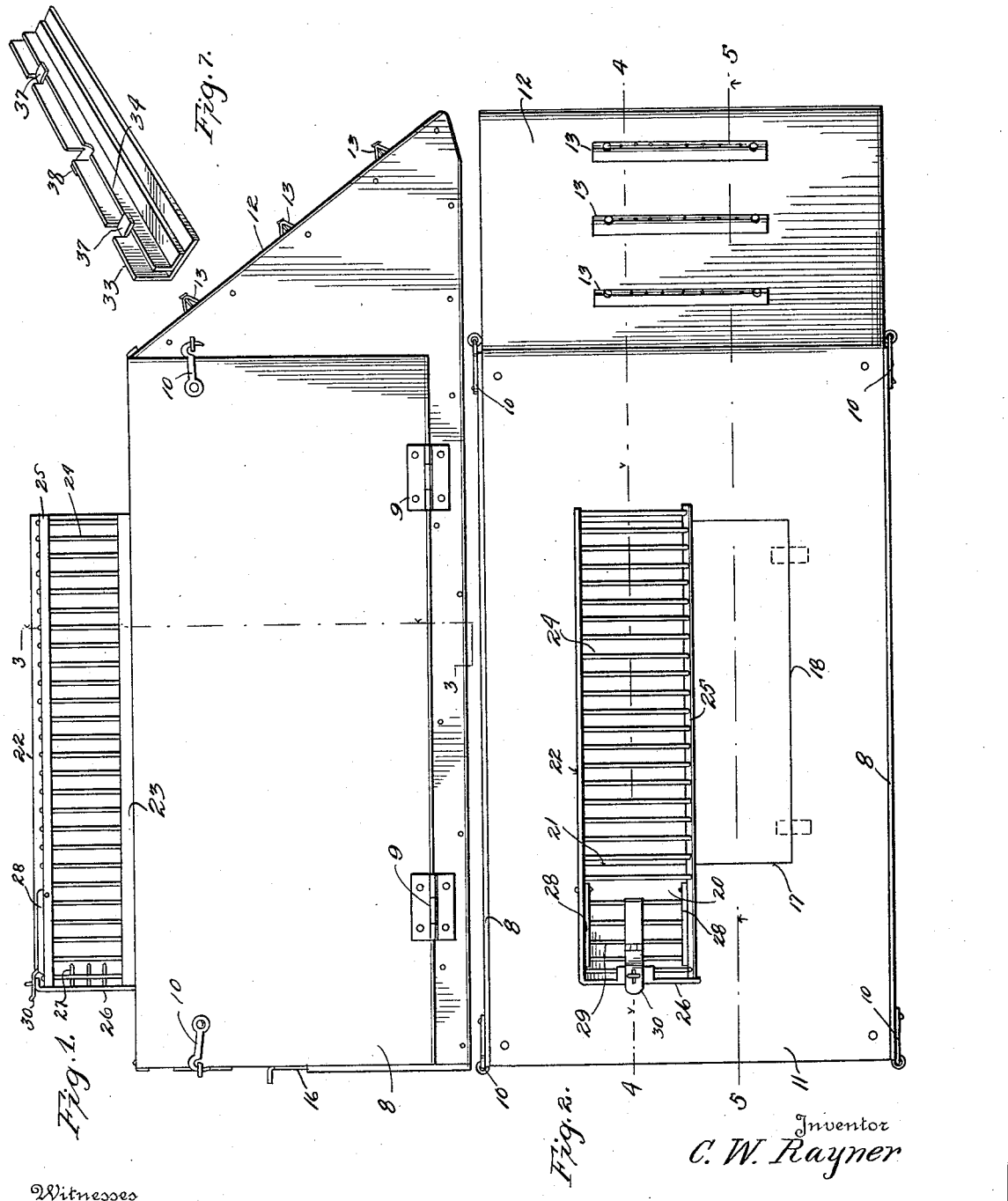

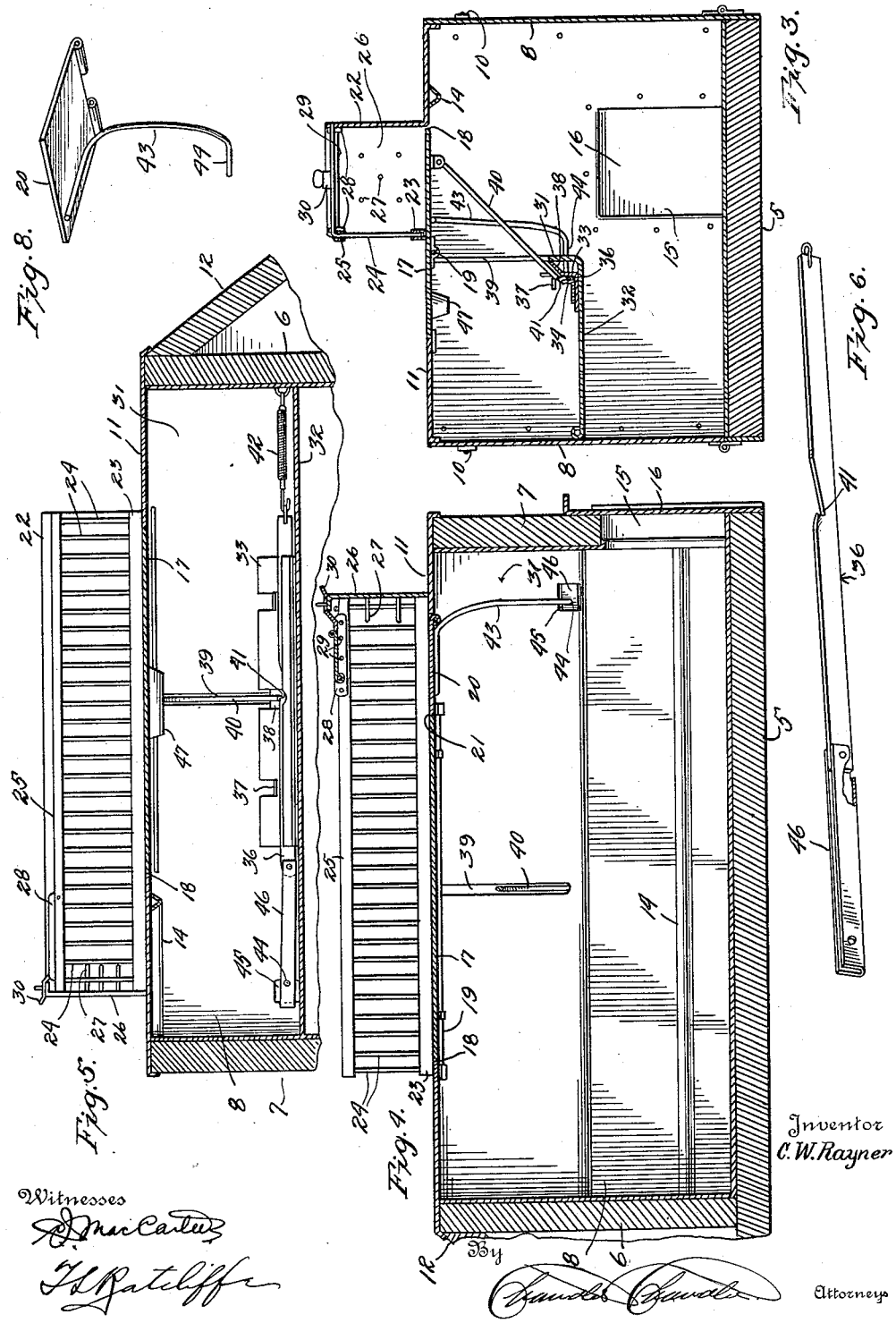

CHARLES W. RAYNER, OF AURORA, ILLINOIS.

SELF-SETTING RAT-TRAP.

1,173,462.  Specification of Letters Patent.  Patented Feb. 29, 1916.

Application filed March 17, 1915. Serial No. 14,993.

*To all whom it may concern:*

Be it known that I, CHARLES W. RAYNER, a citizen of the United States, residing at Aurora, in the county of Kane, State of Illinois, have invented certain new and useful Improvements in Self-Setting Rat-Traps; and I do hereby declare the following to be a full, clear, and exact description of the invention, such as will enable others skilled in the art to which it appertains to make and use the same.

This invention relates to new and useful improvements in traps for rodents is particularly directed to that class of traps which are adapted to catch a rodent and to become automatically reset after catching an animal.

The object of the present invention resides in the provision of an improved trap of the class described which is so constructed that it will not be actuated until the rat or other rodent is in such a position that there is no possibility of its escaping through a premature operation of the trap.

A further object resides in the provision in such a trap of means whereby food may be readily placed in the trap to form an efficient bait and so positioned that the rodent cannot reach the bait.

A still further object is to generally improve the structure and efficiency of a trap of this character.

With the above and other objects and advantages in view, the invention resides more particularly in the novel combination, formation and arrangements of parts, more fully hereinafter described, and particularly pointed out in the appended claims.

Reference is had to the accompanying drawings, wherein similar characters of reference designate corresponding parts throughout the several views, and in which:

Figure 1 is a side elevation of the improved trap. Fig. 2 is a top plan view thereof. Fig. 3 is a transverse sectional view on the line 3—3 of Fig. 1, and Fig. 4 is a longitudinal sectional view on the line 4—4 of Fig. 2. Fig. 5 is a longitudinal sectional view on the line 5—5 of Fig. 2, showing the trigger mechanism for the main platform. Fig. 6 is a perspective view of the trigger holding bar. Fig. 7 is a perspective view of the guide for said bar, and Fig. 8 is a perspective view of the releasing trap door, and the actuating rod carried thereby.

Referring now more particularly to the accompanying drawings, the trap is shown as comprising a main casing including bottom 5, front and rear walls 6 and 7 respectively and side walls 8, which are pivoted to the bottom at 9, and which are provided with latches 10 whereby they may be locked in raised position. Secured on the front and rear walls is a top 11, provided with the trap means to be described. A runway 12 extends diagonally from the front wall, and is provided with a plurality of cleats 13 whereby a rat or other animal may readily get to the top. The casing may be made either of wood lined with metal or be made wholly of metal, in the drawings the ends and bottoms are made of wood lined with metal, and the top and sides are made of metal. When metal is used, the same may be strengthened by the use of suitable brace bars 14 longitudinally secured to the walls. For releasing rats from the trap, the rear wall 6 is provided with an opening 15 adapted to be closed by the slidably mounted door 16.

The main trap door 17 of the trap is adapted to swing in an opening 18 formed in the top 11, and is secured on a shaft 19 which extends longitudinally across the opening to one side of the center thereof. This trap door is normally held locked against pivotal movement, and is adapted to be released by the rat stepping on a releasing platform 20 which is adapted to swing in an opening 21 of the top at the rear of the opening 18, this platform being pivotally secured at the rear of the opening 21, and adapted to swing in a plane at right angles to the plane of the trap door 17. For guiding a rat onto the platform 17 and the platform 20 in its endeavor to reach the bait, a wall 22 is secured along the contiguous sides of the openings 18 and 21 and a bar 23 extends across the longitudinal center of the opening 18 and the other side of the opening 21, and spaced rods or wires 24 extend from the rod 23 and from the top of the wall and have their other ends secured to a rod 25 to thus form a passage way. By providing the plate 22, a smooth surface is had at that side of the platform to which the rat moves when it is tilted and there is thus nothing for the rat to catch hold of so that when the platform is tilted, the rat will be projected into the casing. The rear end of the passage way is closed by a plate 26 and held by this plate are a plurality of pins 27 on which bait may be stuck. To facilitate placing bait, on these pins, the bars or wires 24 terminate short of the rear end of the passage and pivoted to the bar 25 and the wall are a pair of arms 28 which carry the wires 29 thus forming a door which is provided with suitable latch means 30 for locking it.

For supporting the trigger mechanism of the trap and at the same time to provide a shield therefor so that rats trapped in the casing may not render it inoperative, a partition wall 31 is disposed longitudinally in the upper portion of the casing adjacent the shaft 19, and a partition wall 32 extends laterally from the bottom thereof to the adjacent side of the casing. Secured on this last partition is a metal strip having one end turned up at 33 and secured on this strip is a similar strip having a portion 34 disposed vertically whereby a guide groove is formed for a trigger bar 36, portions of the strip 33 being bent over as at 37 to hold this bar in place. The central portion of the strip 33 is slit and bent backwardly against the wall 31 and said wall adjacent this portion is provided with a vertical slot 39. A rod 40 is pivoted to the farther side of the platform 17 and slidably extends through said slot, and is adapted to have its end ride on the bent portion 38 and to engage against the trigger bar. This trigger bar is provided with a cutaway portion 41 which when disposed adjacent the slot lets the rod pass therethrough and thus permits the platform 17 to be tilted, but in a normal position of the trap the rod rests against the trigger bar and holds the platform raised. The trigger bar is normally held in position to accomplish this, by means of a retractile spring 42 secured thereto and to the front wall of of the casing.

To provide means whereby tilting of the releasing platform will actuate the trigger bar to release the main platform, said tilting platform has secured thereto a bar 43 which extends downwardly at the forward end of the platform and is provided with a lateral extension 44 which is slidably passed through a slot 45 in the partition wall 31, and pivotally engaged with a pair of links 46, which are pivoted to said trigger bar 36.

In the operation of the trap, a rat enters the passage way on the top thereof and walks over the main platform until it reaches the releasing platform 21, which is tilted as it steps on it to reach the bait. The tilting of this platform retracts the trigger bar 36, by which the main platform is released to let the rat drop into the casing. When this is done, the platform swings back into place, by the aid of a suitable weight 47 carried at the side thereof and the trap is then set to catch another animal. From the foregoing it is observed that a trap has been provided which is durable and efficient in use. It is noted that the animal must be wholly on the platform 17 before it can tilt, thus there is no possibility of the trap operating prematurely.

I claim:

1. In a trap, the combination with a casing, of a main trap door pivoted thereto and urged to closing position, a rod pivoted to the trap door, a guide way for the free end of the rod, a releasing member pivoted adjacent the trap door, a bar slidable across the guideway for holding the rod against movement to release the trap door and resiliently urged to such holding position, and means connecting the releasing member and the bar for retracting the same to release the trap door.

2. A trap of the class described comprising a main casing, a trap door pivoted at the top of the casing, a releasing platform pivoted at the end of said trap door, a partition disposed longitudinally in the casing adjacent the pivotal connection of the trap door, and provided with a vertical slot, a rod pivoted to the trap door and slidable through said slot, a horizontal partition in the casing, a guide way on said partition, a bar slidable in said guide way, and adapted to be engaged by the rod, the said bar being provided with a cutaway portion for releasing said rod, a rod secured to the releasing platform and pivotally connected with the bar for retracting the same, and a spring secured to the bar and normally urging it to holding position.

In testimony whereof, I affix my signature, in the presence of two witnesses.

CHARLIE W. RAYNER.

Witnesses:
JOHN G. GABRIELSON,
W. J. TYERS.